(12) United States Patent
Takahashi et al.

(10) Patent No.: US 8,012,613 B2
(45) Date of Patent: Sep. 6, 2011

(54) MAGNETIC RECORDING MEDIUM, PROCESS FOR PRODUCING SAME, AND MAGNETIC RECORDING REPRODUCING APPARATUS

(75) Inventors: Migaku Takahashi, Sendai (JP); Shin Saito, Sendai (JP); Tomoyuki Maeda, Kawasaki (JP); Akihiko Takeo, Kawasaki (JP); Yuzo Sasaki, Ichihara (JP); Ryuji Sakaguchi, Ichihara (JP)

(73) Assignees: Showa Denko K.K., Tokyo (JP); Toshiba Corporation, Tokyo (JP); Tohoku University, Miyagi (JP)

( * ) Notice: Subject to any disclaimer, the term of this patent is extended or adjusted under 35 U.S.C. 154(b) by 0 days.

(21) Appl. No.: 12/663,350

(22) PCT Filed: Jun. 6, 2008

(86) PCT No.: PCT/JP2008/060498
§ 371 (c)(1),
(2), (4) Date: Dec. 7, 2009

(87) PCT Pub. No.: WO2008/149998
PCT Pub. Date: Dec. 11, 2008

(65) Prior Publication Data
US 2010/0173175 A1     Jul. 8, 2010

(30) Foreign Application Priority Data
Jun. 6, 2007   (JP) .................................. 2007-149900

(51) Int. Cl.
*G11B 5/66* (2006.01)
(52) U.S. Cl. .................................................. 428/831.2
(58) Field of Classification Search .................. None
See application file for complete search history.

(56) References Cited

U.S. PATENT DOCUMENTS

| | | | |
|---|---|---|---|
| 6,579,590 B2 * | 6/2003 | Ju et al. .................. | 428/848.8 |
| 7,067,206 B2 | 6/2006 | Uwazumi et al. | |
| 7,687,158 B2 * | 3/2010 | Takahashi et al. ......... | 428/831.2 |
| 2003/0064253 A1 * | 4/2003 | Uwazumi et al. ....... | 428/694 TP |
| 2004/0023074 A1 * | 2/2004 | Shimizu et al. ....... | 428/694 MM |

FOREIGN PATENT DOCUMENTS

| | | | |
|---|---|---|---|
| JP | 62-132224 A | 6/1987 | |
| JP | 2001-6158 A | 1/2001 | |
| JP | 2002-222517 A | 8/2002 | |
| JP | 2003-36525 A | 2/2003 | |
| JP | 2003-77122 A | 3/2003 | |
| JP | 2004-70980 A | 3/2004 | |

OTHER PUBLICATIONS

Saib et al., "Electronic properties and elastic constants of wurtzite, zinc-blende and rocksalt AlN," J. Phys. Chem. Solids, vol. 67, 2006, pp. 1888-1892.*

* cited by examiner

*Primary Examiner* — Holly Rickman
(74) *Attorney, Agent, or Firm* — Sughrue Mion, PLLC

(57) ABSTRACT

A magnetic recording medium is provided, which has at least one soft magnetic layer, at least one seed layer, at least one underlayer and at least one perpendicular magnetic recording layer, and is characterized in that the or each seed layer is comprised of a covalently bonded material. The covalently bonded material preferably predominantly comprises a nitride having a hexagonal crystal structure, more preferably, predominantly comprises aluminum nitride having a hexagonal wurtzite crystal structure. This magnetic recording medium is superior in recording and reproducing an information with high density.

14 Claims, 2 Drawing Sheets

MAGNETIC RECORDING MEDIUM, PROCESS FOR PRODUCING SAME, AND MAGNETIC RECORDING REPRODUCING APPARATUS

TECHNICAL FIELD

This invention relates to a magnetic recording medium, a process for producing the magnetic recording medium, and a magnetic recording reproducing apparatus provided with the magnetic recording medium.

BACKGROUND ART

In recent years, magnetic recording apparatuses such as a magnetic disk apparatus, a flexible disk apparatus and a magnetic tape apparatus are widely used and their importance is increasing. Recording density of a magnetic recording medium used in the magnetic recording apparatuses is greatly enhanced. Especially, since the development of MR head and PRML technique, the areal recording density is more and more increasing. Recently GMR head and TuMR head have been developed, and the rate of increase in the plane recording density is very remarkable.

There is still increasing a demand for further enhancing the recording density in magnetic recording media, and therefore, a magnetic layer having a higher coercive force and a higher signal-to-noise (S/N) ratio, and a high resolution are eagerly desired.

In longitudinal magnetic recording media heretofore widely used, a self-demagnetization effect becomes significantly manifested, that is, adjacent magnetic domains in magnetic transition regions exhibit a function of counteracting the magnetization each other with an increase in a line recording density. To minimize the self-demagnetization effect, thickness of the magnetic recording layer must be reduced to enhance the shape magnetic anisotropy.

However, with a decrease in thickness of the magnetic recording layer, the magnitude of energy barrier for keeping the magnetic domains approximates to the magnitude of heat energy, and consequently, the heat fluctuation occurs, i.e., the recorded magnetization is reduced by the influence of the temperature. This undesirable phenomenon puts an upper limit on the line recordation density.

Recently, an anti-ferromagnetic coupling (AFC) medium has been proposed as means for solving the above-mentioned problem of limitation in the line magnetic recording density in the longitudinal magnetic recording media, which problem arises due to the alleviation of magnetization upon heating.

Perpendicular magnetic recording media attract widespread attention as means for enhancing the plane magnetic recording density. The perpendicular magnetic recording media are characterized in that the magnetization occurs in a direction perpendicular to the major surface of the magnetic recording media, which is in a contrast to the transitional longitudinal magnetic recording media wherein the magnetization occurs in an in-plane direction. Due to this characteristic, the undesirable self-demagnetization effect as encountered as an obstacle for enhancing the line recording density in the longitudinal magnetic recording media can be avoided, and the magnetic recording density can be more enhanced. Further, the thickness of magnetic recording layer can be maintained at a certain level, and thus, the problem of alleviation of magnetization upon heating as encountered in the traditional longitudinal magnetic recording media can be minimized.

In the manufacture of perpendicular magnetic recording media, a seed layer, an underlayer, a magnetic recording layer and an overcoat are usually formed in this order on a non-magnetic substrate. Further, a lubricating layer is often formed on the uppermost overcoat. In many recording media, a soft magnetic layer is formed under the underlayer. The underlayer is formed for the purpose of improving the characteristics of the magnetic recording layer, and the seed layer is formed for the purpose of providing desired crystal orientation and controlling the size of magnetic grains.

To produce perpendicular magnetic recording media having a high recording density and other improved magnetic characteristics, the crystalline structure of the magnetic recording layer is important. More specifically, in perpendicular magnetic recording media, the crystalline structure in the magnetic recording layer is often a hexagonal close-packed (hcp) structure. In this crystalline structure, it is important that the (002) crystal plane is parallel to the substrate surface, that is, the crystal c-axes ([002] axes) are aligned in the direction perpendicular to the substrate surface with minimized disturbance.

However, a perpendicular magnetic recording medium has a problem such that the total thickness of the magnetic recording medium is larger than that of the conventional longitudinal magnetic recording medium, although the perpendicular magnetic recording medium is advantageous in that the thickness of a magnetic recording layer can be relatively large. The formation of the perpendicular magnetic recording medium having a large thickness easily causes stacking faults in the crystalline structure at the steps of layers.

To align the crystal grains in the perpendicular magnetic recording medium without disturbance, an underlayer comprised of ruthenium having a hcp structure is usually formed in the medium, which is similar to the conventional longitudinal magnetic recording medium. In this medium, crystals in the magnetic recording layer epitaxially grow on (002) crystal plane of ruthenium, and thus, the magnetic recording medium exhibits enhanced crystalline orientation (see, for example, patent document 1).

The seed layer formed beneath the underlayer has a purpose of enhancing the crystalline orientation in the underlayer. Therefore, the seed layer has hitherto been formed from an amorphous material so as to have a smooth surface parallel to the substrate surface (see, for example, patent document 2).

The (002) crystal plane of the hop structure is orientated preferentially on (111) crystal plane of fcc structure, and therefore, the seed layer has also hitherto been formed from crystalline material having a fcc structure (see, for example, patent document 3).

In another aspect, the seed layer is required to be composed of fine crystal grains for giving a magnetic recording medium having improved recording/reproducing characteristic. However, in the case when the seed layer is comprised of an amorphous material, the crystal grains in the magnetic recording layer are not uniform in diameter and have large distribution of grain diameters. In the case when the seed layer is formed from a fcc crystal material, the size of crystal grains in the magnetic recording layer is difficult to control. Thus, the seed layer comprised of an amorphous material or a crystalline material with a fcc structure is difficult to give a magnetic recording medium having a satisfying recording and reproducing characteristics.

Thus, it is still eagerly desired to give a perpendicular magnetic recording medium having a seed layer comprised of a material having a uniform grain size distribution and capable of enhancing the crystalline orientation in the underlayer, and thus, which medium has improved recording/reproducing characteristic, and can be produced without difficulty.

Patent document 1: JP 2001-6158 A1
Patent document 2: JP 2004-70980 A1
Patent document 3: JP 2003-77122 A1

DISCLOSURE OF THE INVENTION

Problems to be Solved by the Invention

In view of the foregoing background art, a primary object of the present invention is to provide a magnetic recording medium characterized as exhibiting enhanced perpendicular crystal orientation of magnetic crystal grains and comprising minute crystal grains, and thus, characterized as being capable of recording and reproducing information with high density.

Another object of the present invention is to provide a process for producing the magnetic recording medium having the above-mentioned beneficial characteristics.

A further object of the present invention is to provide a magnetic recording reproducing apparatus provided with a magnetic recording medium having the above-mentioned beneficial characteristics.

Means for Solving the Problems

To achieve the above-mentioned objects, the present invention provides the following magnetic recording mediums (1)-(9).

(1) A magnetic recording medium having at least one soft magnetic layer, at least one seed layer, at least one underlayer and at least one perpendicular magnetic recording layer, which are formed in turn on a non-magnetic substrate, characterized in that at least one of said at least one seed layer is comprised of a covalently bonded material.

(2) The magnetic recording medium as described above in (1), wherein said covalently bonded material predominantly comprises a nitride having a hexagonal crystal structure.

(3) The magnetic recording medium as described above in (1), wherein said covalently bonded material predominantly comprises aluminum nitride (AlN) having a hexagonal wurtzite crystal structure.

(4) The magnetic recording medium as described above in any one of (1) to (3), wherein said covalently bonded material has an average crystal grain diameter in the range of 3 nm to 12 nm.

(5) The magnetic recording medium as described above in any one of (1) to (4), wherein said at least one seed layer has a total thickness in the range of 0.1 nm to 40 nm.

(6) The magnetic recording medium as described above in any one of (1) to (5), wherein said at least one soft magnetic layer has a soft magnetic amorphous structure.

(7) The magnetic recording medium as described above in any one of (1) to (6), which further has a layer comprised of a material with a face-centered cubic (fcc) structure, between said at least one soft magnetic layer and said at least one seed layer.

(8) The magnetic recording medium as described above in any one of (1) to (7), wherein said at least one underlayer has a face-centered cubic (fcc) crystal structure or a hexagonal close-packed (hop) crystal structure.

(9) The magnetic recording medium as described above in any one of (1) to (8), wherein said at least one perpendicular magnetic recording layer is comprised of an oxide magnetic material.

In accordance with the present invention, there are further provided the following processes (10)-(19) for producing a magnetic recording medium.

(10) A process for producing a magnetic recording medium, which comprises forming at least one soft magnetic layer, at least one seed layer, at least one underlayer and at least one perpendicular magnetic recording layer, in turn on a non-magnetic substrate, characterized in that said at least one seed layer is formed from a covalently bonded material.

(11) The process for producing a magnetic recording medium as described above in (10), wherein the formation of the seed layer is carried out by forming the covalently bonded material into a thin film on a heated substrate.

(12) The process for producing a magnetic recording medium as described above in (10) or (11), wherein the covalently bonded material predominantly comprises a nitride having a hexagonal crystal structure.

(13) The process for producing a magnetic recording medium as described above in (10) or (11), wherein the covalently bonded material predominantly comprises aluminum nitride (AlN) having a hexagonal wurtzite crystal structure.

(14) The process for producing a magnetic recording medium as described above in any one of (10) to (13), wherein the covalently bonded material has an average crystal grain diameter in the range of 3 nm to 12 nm.

(15) The process for producing a magnetic recording medium as described above in any one of (10) to (14), wherein said at least one seed layer has a total thickness in the range of 0.1 nm to 40 nm.

(16) The process for producing a magnetic recording medium as described above in any one of (10) to (15), wherein said at least one soft magnetic layer has a soft magnetic amorphous structure.

(17) The process for producing a magnetic recording medium as described above in any one of (10) to (16), which further comprising forming a layer comprised of a material with a face-centered cubic (fcc) structure, between said at least one soft magnetic layer and said at least one seed layer.

(18) The process for producing a magnetic recording medium as described above in any one of (10) to (17), wherein said at least one underlayer has a face-centered cubic (fcc) crystal structure or a hexagonal close-packed (hcp) crystal structure.

(19) The process for producing a magnetic recording medium as described above in any one of (10) to (18), wherein said at least one perpendicular magnetic recording layer is formed from an oxide magnetic material.

In accordance with the present invention, there are further provided the following magnetic recording medium (20).

(20) magnetic recording reproducing apparatus provided with a magnetic recording medium and a magnetic head for recording and reproducing an information in the magnetic recording medium, characterized in that the magnetic recording medium is a magnetic recording medium as described above in any one of (1) to (9).

Effect of the Invention

The perpendicular magnetic recording medium according to the present invention has a perpendicular magnetic recording layer with a crystalline structure wherein the crystal c-axis in a hcp structure is oriented perpendicularly to the surface of substrate with a minimized angle variation, and the crystal grains constituting the perpendicular magnetic recording layer have a uniform grain diameter and an extremely small average grain diameter, and which exhibits highly enhanced recording density characteristic.

EXPLANATION OF REFERENCE NUMERALS

Figure 1:
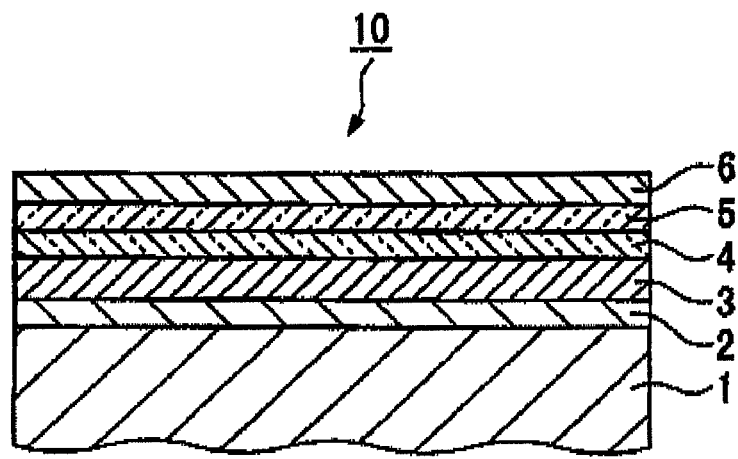
FIG. 1 is an enlarged cross-section illustrating one example of a perpendicular magnetic recording medium according to the present invention.

1 Non-magnetic substrate
2 Soft magnetic layer
3 Seed layer
4 Underlayer
5 Perpendicular magnetic recording layer
6 Overcoat
10 Magnetic recording medium
11 Medium-driving part
12 Magnetic head
13 Head driving part
14 Recording-reproducing signal system

BEST MODE FOR CARRYING OUT THE INVENTION

As illustrated in FIG. 1, the perpendicular magnetic recording medium 10 according to the present invention has a multilayer structure having at least one soft magnetic layer 2; at least one seed layer 3 having a function of controlling crystal orientation of a layer formed thereon; at least one underlayer 4; at least one perpendicular magnetic recording layer 5, wherein the magnetic easy axis (i.e., crystal c-axis) is aligned in a direction approximately perpendicular to the surface of substrate 1; and an optional overcoat 6; which layers are formed in turn on a substrate 1.

The non-magnetic substrate used in the magnetic recording medium of the present invention is not particularly limited provided that it is comprised of a non-magnetic material, and, as specific examples thereof, there can be mentioned aluminum alloy substrates predominantly comprised of aluminum such as, for example, an Al—Mg alloy substrate; and substrates made of ordinary soda glass, aluminosilicate glass, amorphous glass, silicon, titanium, ceramics, sapphire, quartz and resins. Of these, aluminum alloy substrates and glass substrates such as crystallized glass substrates and amorphous glass substrate are preferably used. As the glass substrates, mirror polished glass substrates and low surface roughness (Ra) glass substrates (having Ra<1 angstrom) are preferably used. The substrates may be textured to a slight extent.

The respective layers of the magnetic recording medium will be explained.

The soft magnetic layer is comprised of a material having a soft magnetic property, and has a function of, when a signal is recorded in the medium, conducting recording magnetic field from a head and imposing a perpendicular magnetic recording field to the magnetic recording layer with enhanced efficiency.

As specific examples of the material for the soft magnetic layer, there can be mentioned FeCo alloys, CoZrNb alloys and CoTaZr alloys. The soft magnetic layer preferably has an amorphous structure because the increase in surface roughness (Ra) can be prevented and lift-up of a magnetic head is minimized, thereby highly improving the recording density characteristics.

The soft magnetic layer may be either a single layer or a multi-layer comprised of two or more layers. A preferable modified example thereof has a multi-layer structure wherein an extremely thin film of non-magnetic material such as ruthenium is sandwiched between two soft magnetic layers, i.e., an anti-ferromagnetic coupling (AFC) is given between two soft magnetic layers.

The total thickness of the soft magnetic layer or layers is appropriately determined depending upon the balance between the recording/reproducing characteristics of the magnetic recording layer and the overwrite (OW) characteristics thereof, but the thickness is usually in the range of 20 nm to 120 nm.

The seed layer in the magnetic recording medium of the present invention is characterized as being comprised of a covalently bonded material to enhance the perpendicular orientation of the underlayer and the magnetic recording layer formed on the underlayer.

The term "covalently bonded material" as used herein refers to a material constituted by a chemical bond formed by the sharing of one or more electrons between atoms. As specific examples of the covalently bonded material, nitrides such as AlN, $Ta_2N$, $Ni_3N$ and MoN are mentioned.

The covalently bonded material can be easily formed into a thin film exhibiting crystal orientation equal to or higher than that of metal alloys. In the case when the seed layer comprised of a covalently bonded material has a hexagonal crystal structure or a face-centered cubic crystal structure, the underlayer having a face-centered cubic (fcc) crystal structure or a hexagonal close-packed (hcp) crystal structure is orientated with high efficiency. Especially when the underlayer is comprised of a Ru or Re alloy having a hcp structure, the crystal c axis ([002]axis) is perpendicularly orientated with very high efficiency.

The covalently bonded material constituting the seed layer usually has an average crystal grain diameter in the range of 3 nm to 12 nm.

The seed layer or layers usually have a total thickness in the range of 0.1 nm to 40 nm. In the case when the covalently bonded material in the seed layer or layers has a hexagonal crystal structure, the total thickness of the seed layer or layers is preferably in the range of 3 nm to 20 nm, more preferably 3 nm to 10 nm.

In the case when the covalently bonded material in the seed layer or layers has a hexagonal crystal structure, the c-axis dispersion angle Δθ50 is approximately equal to or smaller than that of the conventional seed layer comprised of a metal alloy crystal, and thus, the perpendicular magnetic recording medium exhibits excellent perpendicular magnetic crystal orientation.

A covalently bonded material predominantly comprising a nitride having a hexagonal crystal structure is preferably used as the covalently bonded material for the seed layer or layers. An especially preferable covalently bonded material predominantly comprises aluminum nitride (AlN) having a hexagonal wurtzite crystal structure. By the term "predominantly comprises (or comprising)" as herein used, we mean that the content is at least %50% by weight.

The covalently bonded material has poor wettability with a metallic material, and hence, the crystal grain diameter of the covalently bonded material on the soft magnetic layer comprised of a metallic material can be controlled by itself. Therefore, in the case when the underlayer epitaxially grows on the seed layer, the crystal grain diameter of the underlayer can also be controlled.

Even in the case when the underlayer does not epitaxially grows on the seed layer, the crystal grain diameter of the underlayer can also be controlled because the seed layer exhibits poor wettability with the underlayer.

A layer comprised of a material with a face-centered cubic (fcc) structure can be formed between the soft magnetic layer or layers and the seed layer or layers. As specific examples of the material with a fcc structure, Ni—Ta, Ni—V, Ni—Nb, Ni—W, Ni—Fe and Ni—Mn are mentioned. The thickness of the layer composed of the material with a fcc structure is preferably approximately 5 nm.

The underlayer in the magnetic recording medium of the present invention preferably has a face-centered cubic (fcc) crystal structure or a hexagonal close-packed (hcp) crystal structure. More specifically, the underlayer is preferably comprised of a material having a hop crystal structure which is similar to the material in the magnetic recording layer, or comprised of a material having a fcc crystal structure having orientated (111) crystal plane, which easily orientates the (002) plane of crystal grains having a hcp structure in the magnetic recording layer.

The material having a hcp crystal structure specifically includes, for example, Ru, Re and alloys of these metals. The material having a fcc crystal structure specifically includes, for example, Pt, Pd and alloys of these metals.

The underlayer may be either a single layer or a multi-layer comprised of two or more layers.

The material in the underlayer preferably has an average crystal grain diameter in the range of 6 nm to 20 nm, more preferably 6 nm to 8 nm. The average crystal grain diameter can be measured by a plane TEM image. The underlayer or layers usually have a total thickness in the range of approximately 5 nm to 30 nm.

The crystal orientation of the magnetic recording layer varies mainly depending upon the crystal orientation of the underlayer. Therefore the crystal orientation of the underlayer is important for the manufacture of the perpendicular magnetic recording medium. Further, if the average diameter of crystal grains in the underlayer is finely controlled, then, average diameter and form of the crystal grains in the magnetic recording layer continuously formed on the underlayer can also be controlled. Thus, a perpendicular magnetic recording layer comprised of minute crystal grains can be obtained. It is believed that the signal-to-noise ratio (SNR) can be enhanced with an increase in minuteness of the crystal grains.

It can be evaluated by the full width at half-maximum (FWHM) ($\Delta\theta50$) of a rocking curve whether the crystal c-axis ([002] axis) in the magnetic recording layer in the perpendicular magnetic recording medium is aligned in perpendicular to the substrate surface with minimized disturbance, or not. The FWHM $\Delta\theta50$ of a rocking curve is determined as follows. A magnetic recording layer formed on the substrate is analyzed by X-ray diffractometry, i.e., the crystal face which is parallel to the substrate surface is analyzed by scanning the incident angle of X-ray to observe diffraction peaks corresponding to the crystal faces. In the perpendicular magnetic recording medium having a magnetic recording layer comprising a cobalt alloy magnetic material, crystal orientation occurs so that the direction of the c-axis [002] of the hcp structure is perpendicular to the substrate surface, peaks attributed to the (002) crystal face are observed. Then the optical system is swung relative to the substrate surface while a Bragg angle diffracting the (002) crystal face is maintained. The diffraction intensity of the (002) crystal face relative to the angle at which the optical system is inclined is plotted to draw a rocking curve with a center at a swung angle of zero degree. If the (002) crystal faces are well aligned in parallel with the substrate surface, a rocking curve with a sharp shape is obtained. In contrast, if the (002) crystal faces are aligned with a broad angle dispersion, a rocking curve with a broadly widened shape is obtained. Thus, the crystal orientation in the perpendicular magnetic recording medium can be evaluated on the basis of the FWHM $\Delta(delta)\theta50$ of the rocking curve. The $\Delta(delta)\theta50$ denotes dispersion of the orientation of crystal grains. The smaller the $\Delta(delta)\theta50$, the more excellent the crystalline orientation.

The magnetic recording layer has a function of recording a signal. The ferromagnetic material in the magnetic recording layer includes cobalt alloys, and, as specific examples of the cobalt alloys, there can be mentioned CoCr, CoCrPt, CoCrPt—O, CoCrPt—$SiO_2$, CoCrPt—$Cr_2O_3$, CoCrPt—$TiO_2$, CoCrPt—$ZrO_2$, CoCrPt—$Nb_2O_5$, CoCrPt—$Ta_2O_5$ and CoCrPt—$TiO_2$.

Of these, an oxide-containing magnetic material such as an oxide-containing cobalt alloy is preferable. The oxide-containing cobalt alloys generally have a granular structure comprising ferromagnetic crystal grains of cobalt alloy, and grain boundary portions surrounding the crystal grains, which portions are comprised of an oxide. In such granular structure, the mutual magnetic action among the cobalt alloy crystal grains is weakened whereby the noise is decreased. Thus, the crystalline structure and the magnetic characteristics of the magnetic recording layer regulate the recording/reproducing characteristics of the magnetic recording medium.

To form a magnetic recording layer with the above-mentioned granular structure, the underlayer is formed preferably under a relatively high gaseous pressure so that the formed underlayer has a rough surface. When the magnetic recording layer is formed from an oxide-containing magnetic material, the oxide grains tend to deposit in minute recesses on the rough surface of the underlayer, thereby forming the above-mentioned granular structure. However, if the underlayer is formed under too high gas pressure, the formed underlayer has poor crystal orientation and the surface roughness thereof is undesirably large. By appropriately choosing the gas pressure, the desired granular structure is given to the magnetic recording layer wherein, good crystal orientation is maintained, but the magnetic crystal grains are desirably isolated from each other by the oxide grains, whereby a magnetic recording medium exhibiting a minimized noise is obtained.

An overcoat can be formed on the magnetic recording layer for protecting the magnetic recording medium from damage caused by the contact of the medium with a magnetic head. The overcoat is formed from, for example, carbon or $SiO_2$. Carbon is especially preferably used.

The thickness of the overcoat is usually in the range of approximately 1 to 10 nm, preferably 2 t 6 nm, and more preferably 2 to 4 nm.

The magnetic recording medium according to the present invention is produced by a process comprising the steps of forming at least one soft magnetic layer, at least one seed layer, at least one underlayer and at least one perpendicular magnetic recording layer, in turn on a non-magnetic substrate, characterized in that said at least one seed layer is formed from a covalently bonded material.

In the process for producing the magnetic recording medium, the non-magnetic substrate is preferably washed and then dried prior to the formation of the above-mentioned layers for enhancing the adhesion of the substrate to the layers. The method of washing includes, for example, water washing and etching (i.e., reverse sputtering). The size of the non-magnetic substrate used is not particularly limited.

The formation of the seed layer or layers is preferably carried out by forming the covalently bonded material into a film on a heated substrate. By forming the seed layer or layers on the heated substrate, the crystalline orientation is more enhanced. With an elevation of the temperature of the heated substrate, the Δ(delta)θ50 becomes desirably small. The temperature at which the substrate is heated varies depending upon the heat distortion temperature of the substrate, but, the temperature is usually approximately 300° C. or lower.

The soft magnetic layer or layers, the seed layer or layers, the underlayer, the perpendicular magnetic recording layer or layers and the overcoat can be formed from the above-mentioned materials by the conventional methods. Usually a DC magnetron sputtering method and an RF sputtering method are employed. Imposition of RF bias, DC bias, pulse DC or pulse DC bias can be adopted for sputtering. An inert gas such as, for example, argon can be used as sputtering gas, to which $O_2$ gas, $H_2O$ or $N_2$ gas may be added. The pressure of sputtering gas is appropriately chosen for the respective layers so as to give layers with the desired characteristics, but, the pressure is usually controlled in the range of approximately 0.1 to 30 Pa. An appropriate pressure can be determined depending upon the particular magnetic characteristics of magnetic recording medium.

The overcoat can be formed by, for example, a sputtering method or a plasma CVD method. A plasma CVD method including a magnetron plasma CVD method is preferably adopted.

The magnetic recording reproducing apparatus according to the present invention is an apparatus provided with a magnetic recording medium and a magnetic head for recording and reproducing an information in the magnetic recording medium, characterized in that the magnetic recording medium is the one as described above.

Figure 2:
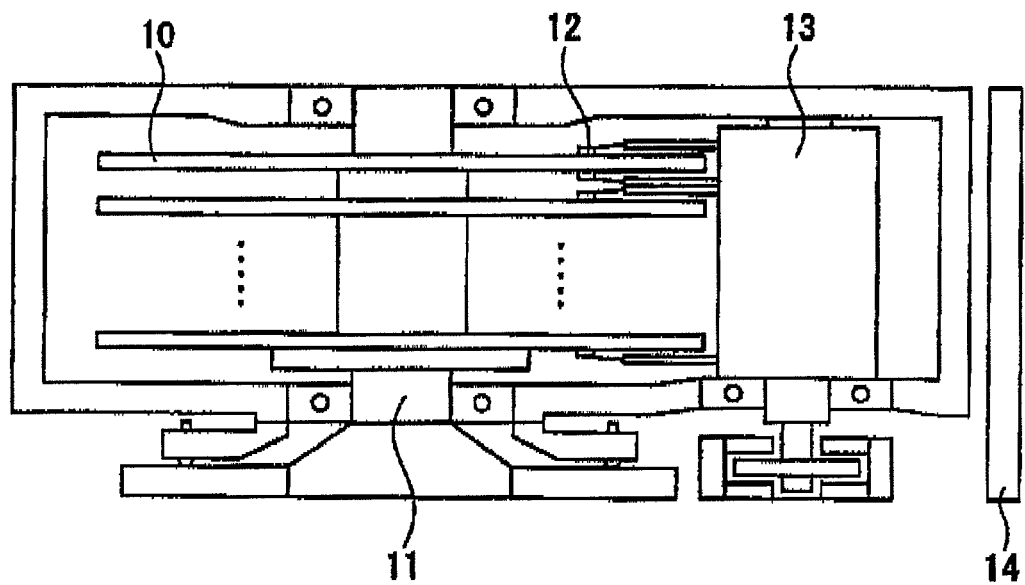
FIG. 2 is a schematic illustration of an example of the magnetic recording-reproducing apparatus of the present invention.

An example of the magnetic recording-reproducing apparatus according to the present invention is illustrated in FIG. 2. The magnetic recording-reproducing apparatus of the present invention comprises, in combination, the magnetic recording medium 10 which has a multi-layer structure as illustrated in FIG. 1; a driving part 11 for driving the magnetic recording medium 10 in the circumferential recording direction; a magnetic head 12 for recording an information on the magnetic recording medium 10 and reproducing the information from the medium 10; a head-driving part 13 for moving the magnetic head 12 in a relative motion to the magnetic recording medium 10; and a recording-and-reproducing signal treating means 14.

The recording-and-reproducing signal treating means 14 has a function of transmitting signal from the outside to the magnetic head 12, and transmitting the reproduced output signal from the magnetic head 12 to the outside.

As the magnetic head 12 provided in the magnetic recording reproducing apparatus according to the present invention, there can be used a magnetic head provided with a reproduction element suitable for high-magnetic recording density, which includes a magneto-resistance (MR) element exhibiting anisotropic magnetic resistance (AMR) effect, a GMR element exhibiting giant magneto-resistance (GMR) effect and a TuMR element exhibiting a tunneling magneto-resistance effect.

EXAMPLES

The invention will now be described specifically by the following examples.

Example 1

Comparative Example 1

A glass substrate for HD was placed in a vacuum chamber and the chamber was evacuated to a reduced pressure of below $1.0·10^{-5}$ Pa.

A soft magnetic layer comprised of CoNbZr and having a thickness of 50 nm was formed on the glass substrate. The formation of the soft magnetic layer was carried out by a sputtering method at a reduced pressure of 0.6 Pa in an argon atmosphere.

A seed layer comprised of AlN as a covalently bonded material was formed on the soft magnetic layer by reactive sputtering. The reactive sputtering was carried out using aluminum target and $N_2$ gas and argon gas. The relative volume rate in flow of $N_2$ gas to argon gas was 0%, 10%, 20%, 30%, 40% and 50% in Comparative Examples 1-1 to 1-3 and Examples 1-1 to 1-3, respectively. The total gas pressure $(Ar+N_2)$ was maintained at 0.6 Pa. As the volume rate in flow of $N_2$ gas is increased, the rate of deposition of aluminum thin film is reduced. Therefore, the relationship between the volume rate in flow of $(Ar+N_2)$ gas and the deposition rate of aluminum thin film was previously determined. Based on the obtained data for this relationship, the sputtering conditions were controlled so as to obtain a thin film having a thickness of 5 nm.

As an alternative method for the reactive sputtering to form an AlN layer, a sputtering method using an AlN target can also be adopted.

To evaluate the crystalline orientation of AlN itself, thin films with a thickness of 20 nm were formed by the sputtering wherein the relative volume rate in flow of gases, discharge power and other conditions remained substantially the same as mentioned above (Comparative Examples 1-4 to 1-6 and Examples 1-4 to 1-6).

On the seed layer, an underlayer, a magnetic recording layer and an overcoat were formed in turn in Comparative Examples 1-1 to 1-3 and Examples 1-1 to 1-3, by the methods mentioned below.

To evaluate the crystalline orientation of AlN by X-ray diffractometry in Comparative Examples 1-4 to 1-6 and Examples 1-4 to 1-6 without influence by the diffraction of an underlayer and a magnetic recording layer, the underlayer and the magnetic recording layer were not formed in these working examples.

The formation of the underlayer was carried out by a sputtering method at a reduced pressure of 12 Pa in an argon atmosphere. The underlayer formed was comprised of ruthenium having a hcp structure and having a thickness of 20 nm was formed on the soft magnetic layer.

On each underlayer, a magnetic recording layer comprised of Co—Cr—Pt—$SiO_2$ was formed. Further, a protective carbon overcoat was formed on the magnetic recording layer.

Each of the perpendicular magnetic recording mediums made in Comparative Examples 1-1, 1-2 and 1-3 and Examples 1-1, 1-2 and 1-3 was coated with a lubricant, and recording/reproducing characteristics thereof were evaluated using Read-Write Analyzer 1632 and Spin Stand S1701MP, available from GUZIK, US. Further, magneto-static property of the same perpendicular magnetic recording mediums was evaluated using a Kerr tester. Crystal orientation of the CoCrPt magnetic crystal in each magnetic recording layer was evaluated by rocking curve measurement of the magnetic recording layer by X-ray diffractometry.

From the measurement results, a high signal-to-noise ratio (SNR), a coercive force (Hc) and delta θ50 were determined.

The results are shown in Table 1. These characteristics are parameters widely used for evaluating the performance of perpendicular magnetic recording mediums.

TABLE 1

| Specimen | $N_2$ (%) | SNR (dB) | Hc (Oe) | Δθ50 (deg.) |
|---|---|---|---|---|
| Comp. Ex. 1-1 | 0 | 11.42 | 1591 | I.M. *1 |
| Comp. Ex. 1-2 | 10 | 10.6 | 1428 | I.M. |
| Comp. Ex. 1-3 | 20 | 13.38 | 2225 | I.M. |
| Example 1-1 | 30 | 16.56 | 4256 | 3.8 |
| Example 1-2 | 40 | 16.01 | 4109 | 4.4 |
| Example 1-3 | 50 | 15.12 | 3465 | 5.6 |

Note,
*1 I.M.: Impossible to measure

Influence of $N_2$ gas on aluminum was examined on each seed layer by X-ray diffractometry in Comparative Examples 1-4 to 1-6 and Examples 1-4 to 1-6. The peak-occurring diffraction angle (deg.) and the peak intensity (cps) are shown in Table 2.

Figure 3:
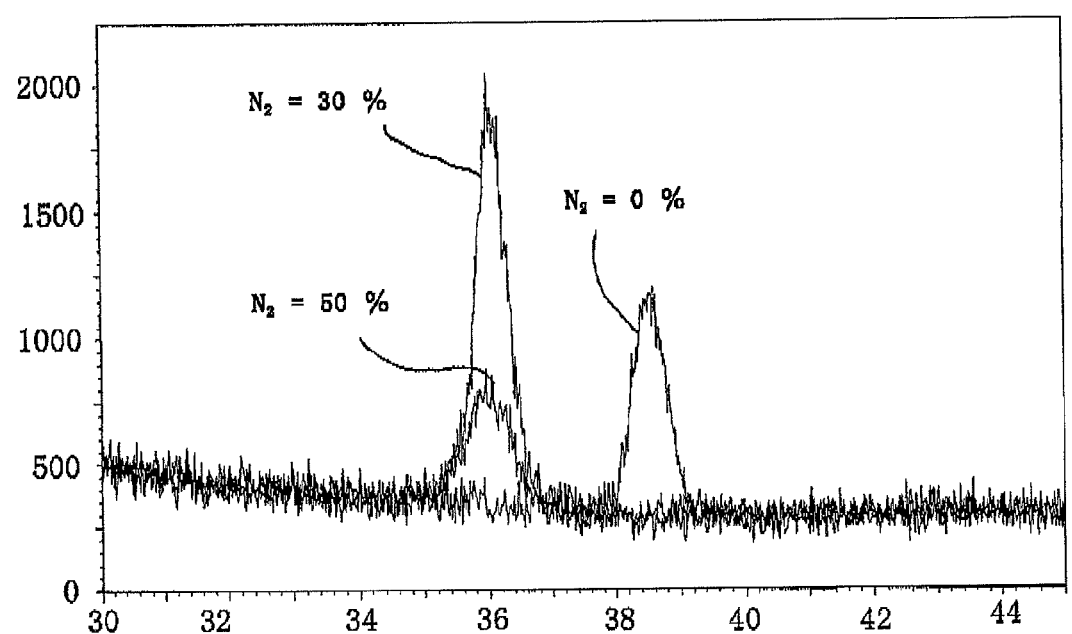
FIG. 3 is an X-ray diffraction profile curve showing a relationship between the diffraction angle (2θ) and peak intensity.

X-ray diffraction intensity curve (2θ: 30 to 45 deg.) as obtained by measurement at relative volume rates in flow of $N_2$ gas of 0%, 30% and 50% in Comparative Example 1-4 and Examples 1-4 and 1-6, respectively, is shown in FIG. 3.

TABLE 2

| Specimen | $N_2$ (%) | Peak *1 (dB) | Intensity *2 (cps) |
|---|---|---|---|
| Comp. Ex. 1-4 | 0 | 38.5 | 1193 |
| Comp. Ex. 1-5 | 10 | — | — |
| Comp. Ex. 1-6 | 20 | 36.01 | 613 |
| Example 1-4 | 30 | 36.04 | 1883 |
| Example 1-5 | 40 | 35.92 | 1475 |
| Example 1-8 | 50 | 35.99 | 883 |

Note,
*1 Peak-occurring diffraction angle
*2 Peak intensity

As seen from Table 1, both of SNR and coercive force Hc increased with an increase in the relative volume rate in flow of $N_2$ gas (%). The SNR and Ho reached peak values at a relative volume rate in flow of $N_2$ gas of 30% (Example 1-1).

As seen from Table 2 and FIG. 3, the diffraction peak, attributed to the fcc (111) crystal plane orientation of aluminum, occurred in the vicinity of 38.5 degree (Comparative Example 1-4), but, the peak intensity became small with an increase in the relative volume rate in flow of $N_2$ gas (%). A diffraction peak, attributed to the hexagonal wurtzite (002) crystal plane orientation of AlN, occurred in the vicinity of 36 degree at a relative volume rate in flow of $N_2$ gas of 20% (Comparative Example 1-6). The diffraction peak became the largest at a relative volume rate in flow of $N_2$ gas of 30% (Example 1-4) That is, with an increase in the relative volume rate in flow of $N_2$ gas (%), the material constituting the seed layer changed from the fcc (111) crystal plane orientation of aluminum to the hexagonal wurtzite (002) crystal plane orientation of AlN. The crystal orientation of AlN became the largest value at a relative volume rate in flow of $N_2$ gas of 30%. It is believed that, at this largest value, approximately the entire amount of aluminum changed to AlN; and further that the increase in the crystal orientation of AlN in the seed layer leads to the enhancement of crystalline orientation of the magnetic recording layer with the results in the SNR and coercive force of the magnetic recording medium.

Example 2

Comparative Example 2

By the same procedures as described in Example 1-1, a soft magnetic layer was formed on a glass substrate, and then a seed layer comprised of AlN as a covalently bonded material was formed on the soft magnetic layer by reactive sputtering. The total gas pressure (Ar+$N_2$) was maintained at 0.6 Pa. The relative volume rate in flow of $N_2$ gas to argon gas was 30%. Thus, seed layers having different thicknesses were formed (thickness: 5.0, 7.5 and 10.0 nm in Examples 2-1 to 2-3). On the seed layer, an underlayer, a magnetic recording layer and an overcoat were formed in turn by the same procedures as described in Example 1. All other conditions remained the same.

For comparison, comparative specimen were made by the same procedures as mentioned above except that the seed layer was formed from a different material as follows. All other procedures and conditions remained the same.

In Comparative Examples 2-1 to 2-3, a seed layer comprised of Cu having a fcc crystal structure and having a thickness of 5, 7.5 or 10 nm was formed.

In Comparative Examples 2-4 to 2-6, a seed layer comprised of Ti having a hcp crystal structure and having a thickness of 5, 7.5 or 10 nm was formed.

In Comparative Examples 2-7 to 2-9, a seed layer comprised of Cr having a bcc crystal structure and having a thickness of 5, 7.5 or 10 nm was formed.

In Comparative Examples 2-10 to 2-12, a seed layer comprised of a Ni40Nb alloy having an amorphous structure and having a thickness of 5, 7.5 or 10 nm was formed.

In Comparative Example 2-13, a seed layer was not formed.

The magnetic recording mediums made in the above-mentioned working examples were evaluated for their recording/reproducing characteristic and magneto static characteristic, and crystalline orientation of each magnetic recording layer of the mediums. The results are shown collectively in Table 3.

TABLE 3

| Specimen | Seed layer | Thickness *2 (nm) | SNR (dB) | Hc (Oe) | Δθ50 (deg) |
|---|---|---|---|---|---|
| Example 2-1 | AlN | 5 | 16.62 | 4399 | 3.7 |
| Example 2-2 | ($N_2$ = 30%) | 7.5 | 16.71 | 4525 | 3.6 |
| Example 2-3 | | 10 | 16.66 | 4711 | 3.4 |
| Comp. Ex. 2-1 | Cu | 5 | 15.43 | 4021 | 4.5 |
| Comp. Ex. 2-2 | | 7.5 | 15.56 | 4133 | 4.2 |
| Comp. Ex. 2-3 | | 10 | 15.77 | 4287 | 3.9 |
| Comp. Ex. 2-4 | Ti | 5 | 15.74 | 4088 | 5.1 |
| Comp. Ex. 2-5 | | 7.5 | 15.82 | 4123 | 4.9 |
| Comp. Ex. 2-6 | | 10 | 15.71 | 4165 | 4.9 |
| Comp. Ex. 2-7 | Cr | 5 | 13.26 | 3461 | I.M. *1 |
| Comp. Ex. 2-8 | | 7.5 | 11.93 | 3423 | I.M. |
| Comp. Ex. 2-9 | | 10 | 10.32 | 3211 | I.M. |
| Comp. Ex. 2-10 | $Ni_4ONb$ | 5 | 15.88 | 4066 | 4.5 |
| Comp. Ex. 2-11 | | 7.5 | 15.92 | 4109 | 4.5 |
| Comp. Ex. 2-12 | | 10 | 15.91 | 4173 | 4.3 |
| Comp. Ex. 2-13 | — | 0 | 14.86 | 3356 | 7.4 |

Note.
*1 I.M.: Impossible to measure
*2 Thickness of seed layer

As seen from Table 3, magnetic recording mediums having a seed layer comprised of an AlN covalently bonded material are superior in all of the SNR, coercive force and crystal orientation to the other comparative magnetic recording mediums.

The delta θ50 of the chromium seed layers in Comparative Examples 2-7 to 2-9 could not be measured. This is because hcp (002) crystal plane of Ru in the underlayer is difficult to crystallize on the boo (110) crystal plane of Cr in the seed layer. This phenomenon leads to the reduction of the SNR and coercive force, and crystal orientation of the magnetic recording layer.

To examine the influence of the seed layer on the crystal grain diameter of the magnetic recording layer, the crystal grain diameter in the magnetic recording layer was observed by a plane TEM, on specimens having a seed layer with a thickness of 10 nm and comprised of AlN, Cu, Ti or Ni40Nb (Example 2-3, and Comparative Examples 2-3, 2-6 and 2-12). The average grain diameters and the grain diameter dispersion obtained from the observation of TEM images are shown in Table 4.

TABLE 4

| Specimen | Seed layer | Av. grain diamter (nm) | Grain diamter dispersion |
|---|---|---|---|
| Example 2-3 | AlN ($N_2$ = 30%) | 7.1 | 2.5 |
| Comp. Ex. 2-3 | Cu | 8.9 | 3.2 |
| Comp. Ex. 2-6 | Ti | 8.1 | 3.5 |
| Comp. Ex. 2-12 | Ni40Nb | 7.7 | 3.8 |

As seen from Table 4, when the seed layer is comprised of AlN (Example 2-3), the crystal grain diameter of the magnetic recording layer can be rendered smallest as compared with those obtained when the seed layer is comprised of the other materials. When the seed layer is comprised of Cu (Comparative Example 2-3), the crystal grain diameter of the magnetic recording layer is large. This magnetic recording layer is believed to exhibit good crystal orientation, but poor SNR. When the seed layer is comprised of a Ni40Nb alloy (Comparative Example 2-12), the crystal grain diameter of the magnetic recording layer is relatively small but the dispersion of the grain diameters is large. This magnetic recording layer is believed to exhibit poor SNR.

Thus, in the case when the seed layer is comprised of a covalently bonded AlN (Example 2-3), the crystal orientation in the underlayer and that in the magnetic recording layer are enhanced, but, the seed layer has poor wettability with the underlayer, and hence, the crystal grain diameter in the magnetic recording layer can be desirably controlled.

Example 3

By the same procedures as described in Example 1-1, a soft magnetic layer comprised of CoNbZr and having a thickness of 50 nm was formed on a glass substrate at a reduced pressure of 0.6 Pa in an argon atmosphere. Thereafter, the soft magnetic layer-formed substrate was heated. The heating time of the soft magnetic layer-formed substrate was varied (0, 3, 6 or 9 seconds in Examples 3-1, 3-2, 3-3 and 3-4, respectively) so as to vary the temperature thereof on which the seed layer is to be formed. Then, a seed layer comprised of AlN as a covalently bonded material and having a thickness of 10.0 nm was formed on the heated soft magnetic layer by reactive sputtering. The total gas pressure (Ar+$N_2$) was maintained at 0.6 Pa. The relative volume rate in flow of $N_2$ gas to argon gas was 30%. On the seed layer, an underlayer, a magnetic recording layer and an overcoat were formed in turn by the same procedures as described in Example 1. All other conditions remained the same.

The thus-made magnetic recording mediums were evaluated for crystal orientation of each magnetic recording layer thereof. The results are shown collectively in Table 5.

TABLE 5

| Specimen | Seed layer | Heating time (sec) | Substrate temp. (° C.) | Δ θ 50 (deg.) |
|---|---|---|---|---|
| Example 3-1 | AlN ($N_2$ = 30%) | 0 | Below 70 | 3.5 |
| Example 3-2 | " | 3 | 75 | 2.9 |
| Example 3-3 | " | 6 | 90 | 2.3 |
| Example 3-4 | " | 9 | 110 | 1.8 |

As seen from Table 5, the crystal orientation of the magnetic recording layer is more enhanced with an increase in the heating time and thus in the temperature of the soft magnetic layer-formed substrate. It is believed that the crystal orientation of AlN itself is enhanced by the heating thereof.

Example 4

Comparative Example 4

By the same procedures as described in Example 1-1, a soft magnetic layer comprised of CoNbZr and having a thickness of 50 nm was formed on a glass substrate at a reduced pressure of 0.6 Pa in an argon atmosphere. Then, a layer comprised of Ni10Nb with a fcc structure and having a thickness of 0, 3 or 6 nm was formed in Examples 4-1, 9-2 and 4-3, respectively, on the CoNbZr soft magnetic layer by reactive sputtering. All other procedures and conditions remained the same.

For comparison, a layer comprised of Ni40Nb as an amorphous material and having a thickness of 3 or 6 nm was formed in Comparative Examples 9-1 and 4-2, respectively, on the CoNbZr soft magnetic layer by reactive sputtering.

On each of the Ni10Nb layer and the Ni40Nb layer, a seed layer comprised of AlN and having a thickness of 10.0 nm was formed by reactive sputtering. The total gas pressure (Ar+$N_2$) was maintained at 0.6 Pa. The relative volume rate in flow of $N_2$ gas to argon gas was 30%. On the seed layer, an underlayer, a magnetic recording layer and an overcoat were formed in turn by the same procedures as described in Example 1. All other procedures and conditions remained the same.

The thus-made magnetic recording mediums were evaluated for their recording/reproducing characteristic and magneto static characteristic, and crystal orientation of each magnetic recording layer thereof. The results are shown collectively in Table 6.

TABLE 6

| Specimen | Seed layer | Thickness *2 (nm) | SNR (dB) | Hc (Oe) | Δ θ50 (deg) |
|---|---|---|---|---|---|
| Example 4-1 | Ni10Nb/ | 0/10 | 17.22 | 4523 | 3.3 |
| Example 4-2 | AlN | 3/10 | 17.37 | 4638 | 3 |
| Example 4-3 | ($N_2$ = 30%) | 6/10 | 17.82 | 4702 | 2.7 |
| Comp. Ex. 4-1 | Ni40Nb/ | 3/10 | 17.11 | 4465 | 3.3 |
| Comp. Ex. 4-2 | AlN ($N_2$ = 30%) | 6/10 | 17.14 | 4397 | 3.3 |

Note.
*1 I.M.: Impossible to measure
*2 Thickness of seed layer

As seen from Table 6, a double layer structure composed of the layer of Ni10Nb with a fcc structure and the AlN layer gives a more improved crystal orientation of the magnetic recording layer as compared with a single AlN layer. The SNR and magneto static characteristic are also improved by the double layer structure.

In contrast, a double layer structure composed of the layer of amorphous Ni40Nb and the AlN layer gives a crystal orientation of the magnetic recording layer having the same level as that of a single AlN layer. The SNR and magneto static characteristic are also not improved. Hexagonal AlN crystals are believed to be more easily orientated on the crystal with a fcc structure than on the amorphous layer.

INDUSTRIAL APPLICABILITY

The magnetic recording medium according to the present invention is characterized as having a crystalline structure of the perpendicular magnetic recording layer, more specifically, a hexagonal close-packed (hcp) structure, wherein its crystal c-axes are aligned in the perpendicular direction with minimized angle dispersion, and ferromagnetic crystals in the perpendicular magnetic recording layer have uniform grain diameters, and an extremely small average grain diameter. Therefore the perpendicular magnetic recording medium exhibits improved recording density characteristics.

Utilizing the above-mentioned beneficial characteristics, the magnetic recording medium according to the present invention is suitable for, for example, a magnetic disk apparatus, a flexible disk apparatus and a magnetic tape apparatus.

The perpendicular magnetic recording medium is also suitable for new high-density perpendicular magnetic recording media, such as, for example, ECC media, discrete track media and pattern media, which are expected to have a more enhanced recording density.

The invention claimed is:

1. A magnetic recording medium having at least one soft magnetic layer, at least one seed layer, at least one underlayer and at least one perpendicular magnetic recording layer having a (002) crystal plane-orientated hcp structure, which are formed in turn on a non-magnetic substrate, wherein:
    at least one of said at least one seed layer is comprised of a covalently bonded material predominantly comprising a nitride having a hexagonal crystal structure;
    said at least one underlayer is comprised of Ru or Re, or an alloy thereof, which has a (002) crystal plane-orientated hcp structure, or Pt or Pd, or an alloy thereof, which has a (111) crystal plane-orientated (fcc) structure; and
    a layer comprised of a material selected from the group consisting of Ni—Ta, Ni—V, Ni—Nb, Ni—W, Ni—Fe and Ni—Mn and having a fcc structure is further formed between said at least one soft magnetic layer and said at least one seed layer.

2. The magnetic recording medium according to claim 1, wherein said covalently bonded material predominantly comprises aluminum nitride (AlN) having a hexagonal wurtzite crystal structure.

3. The magnetic recording medium according to claim 1, wherein said covalently bonded material has an average crystal grain diameter in the range of 3 nm to 12 nm.

4. The magnetic recording medium according to claim 1, wherein said at least one seed layer has a total thickness in the range of 0.1 nm to 40 nm.

5. The magnetic recording medium according to claim 1, wherein said at least one soft magnetic layer has a soft magnetic amorphous structure.

6. The magnetic recording medium according to claim 1, wherein said at least one perpendicular magnetic recording layer is comprised of an oxide magnetic material.

7. A process for producing a magnetic recording medium, which comprises forming at least one soft magnetic layer, at least one seed layer, at least one underlayer and at least one perpendicular magnetic recording layer having a (002) crystal plane-orientated hcp structure, in turn on a non-magnetic substrate, wherein:
    said at least one seed layer is formed from a covalently bonded material predominantly comprising a nitride having a hexagonal crystal structure;
    said at least one underlayer is comprised of Ru or Re, or an alloy thereof, which has a (002) crystal plane-orientated hcp structure, or Pt or Pd, or an alloy thereof, which has a (111) crystal plane-orientated (fcc) structure; and
    a layer comprised of a material selected from the group consisting of Ni—Ta, Ni—V, Ni—Nb, Ni—W, Ni—Fe and Ni—Mn and having a fcc structure is further formed between said at least one soft magnetic layer and said at least one seed layer.

8. The process for producing a magnetic recording medium according to claim 7, wherein the formation of the seed layer is carried out by forming the covalently bonded material into a thin film on a heated substrate.

9. The process for producing a magnetic recording medium according to claim 7, wherein the covalently bonded material predominantly comprises aluminum nitride (AlN) having a hexagonal wurtzite crystal structure.

10. The process for producing a magnetic recording medium according to claim 7, wherein the covalently bonded material has an average crystal grain diameter in the range of 3 nm to 12 nm.

11. The process for producing a magnetic recording medium according to claim 7, wherein said at least one seed layer has a total thickness in the range of 0.1 nm to 40 nm.

12. The process for producing a magnetic recording medium according to claim 7, wherein said at least one soft magnetic layer has a soft magnetic amorphous structure.

13. The process for producing a magnetic recording medium according to claim 7, wherein said at least one perpendicular magnetic recording layer is formed from an oxide magnetic material.

14. A magnetic recording reproducing apparatus provided with a magnetic recording medium and a magnetic head for recording and reproducing an information in the magnetic recording medium, characterized in that the magnetic recording medium is a magnetic recording medium as claimed in claim 1.

* * * * *